(No Model.)
W. T. MILLER.
WATER FILTER.
No. 533,136. Patented Jan. 29, 1895.
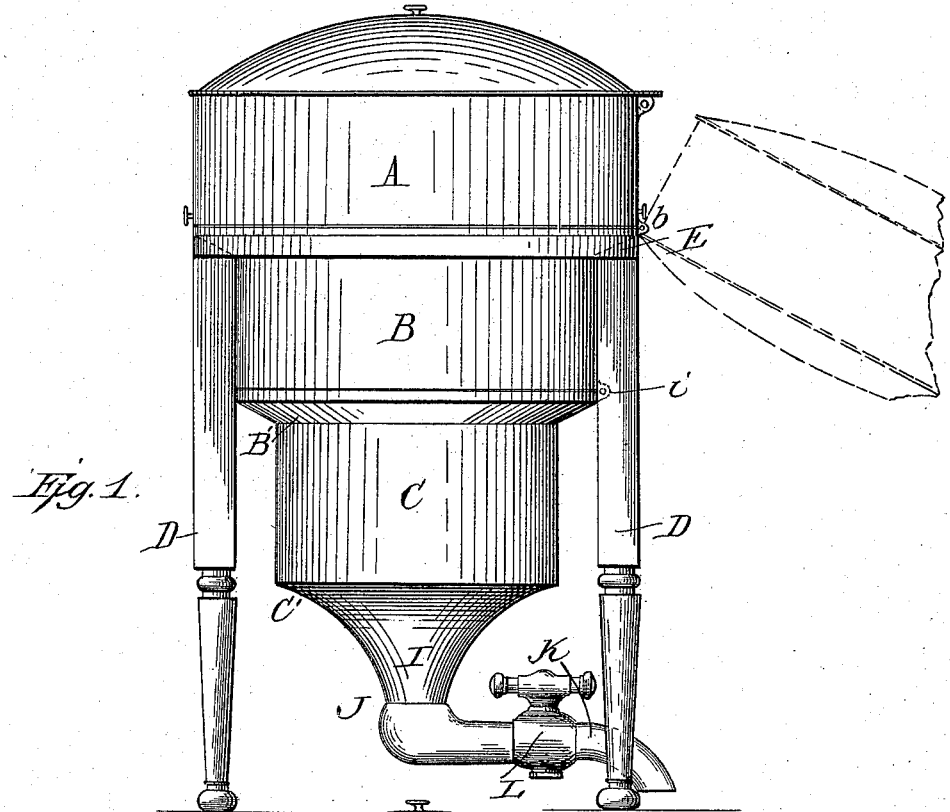
Fig. 1.
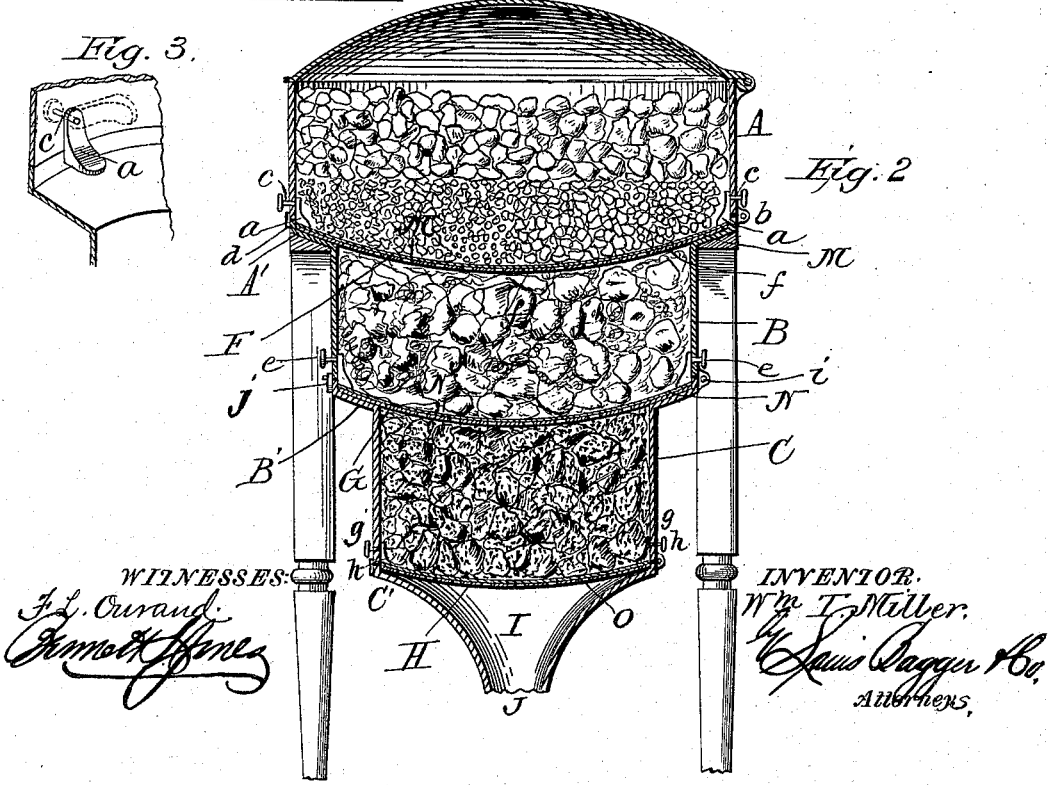
Fig. 3.
Fig. 2.
WITNESSES:
F. L. Ourand
[signature]
INVENTOR.
Wm. T. Miller.
by [signature]
Attorneys.

UNITED STATES PATENT OFFICE.

WILLIAM T. MILLER, OF McKEESPORT, PENNSYLVANIA.

WATER-FILTER.

SPECIFICATION forming part of Letters Patent No. 533,136, dated January 29, 1895.

Application filed October 11, 1893. Serial No. 487,851. (No model.)

*To all whom it may concern:*

Be it known that I, WILLIAM T. MILLER, a citizen of the United States, and a resident of McKeesport, in the county of Allegheny and State of Pennsylvania, have invented certain new and useful Improvements in Water-Filters; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved filter; showing, in dotted lines, how the uppermost or top-section may be hinged to one side of the section or compartment next below. Fig. 2 is a longitudinal sectional view of the same, on a vertical plane through the middle; and Fig. 3 is a detail view of the device for fastening the removable sieves or foraminated screens in the bottoms of the respective sections or compartments of which the complete filter is built up.

Like letters of reference designate corresponding parts in all the figures.

This invention relates to filters, intended more particularly, for domestic and household use for the filtration of water and other liquids, and has for its object to produce an inexpensive, yet durable and efficient filter of such construction that it may be easily cleaned, when desired, and the "packing" (or filtering material) renewed; and with this object in view, it consists in the improved and novel construction and combination of parts of a three-part, or three section filter, as will be hereinafter more fully described and claimed.

On the accompanying drawings, the letters A, B and C denote the three parts or sections of which my improved filter is composed or built up. These may either be circular, square or rectangular, as desired; the example illustrated on the drawings showing the several compartments as round or circular, and supported on legs D D, of suitable height, by means of an annulus, E, upon which the overlapping bottom flange of the top section or uppermost compartment A rests. This consists of a vessel made of any suitable material, such as stone-ware, galvanized iron, aluminium, &c., having an open top and bottom, and a bottom-flange A', which forms an annular seat or support for the removable concavo-convex bottom F, which consists of a circular sheet of aluminium, or other non-oxidizable metal, having a large number of fine perforations $f f$ distributed evenly over its entire area. This foraminated bottom is supported upon the inwardly projecting annular flange A', and is held in place (removably) thereon by means of two or more cleats or turn buttons $a a$, illustrated in detail in Fig. 3 on the drawings, so that by turning these buttons upon their pivots $c$, as shown in dotted lines, the foraminated bottom F may be lifted up and removed from its compartment. The section or chamber B, next below, is of a similar shape and construction, but smaller, and may be connected to the under side of the top section A on one side thereof, by the hinge $b$, and on the other side by a pivoted catch or turn-button $d$. This compartment is also made with an inwardly projecting annular flange B', which serves as a seat or support for the concavo-convex foraminated bottom G, constructed precisely like the upper bottom F, but of smaller diameter, so as to fit loosely into the bottom of the reduced compartment B, within which it is held in place, removably, by means of the turn-buttons $e e$, of the same construction as the turn-buttons $a$ appertaining to the upper bottom F. Lastly, the third or bottom compartment C is of the same general construction as the compartments A and B above it, but still further reduced in size, and, like these, constructed with an inwardly projecting annular flange C'; but the latter is continued in a downward and inwardly slanting direction, so as to form a collecting chamber or reservoir I, below the foraminated and removable concavo-convex bottom H, which terminates in an outlet J, provided at its lower end with a spigot K, provided with a valve, L, for opening or closing it. The reduced foraminated sieve or bottom H appertaining to this compartment is also held in place, removably, upon its annular seat or flange C' by means of two or more turn-buttons $h$, pivoted, at $g$, to the inner sides of the reduced bottom section or compartment C.

Upon each of the foraminated and slightly bulging, or concavo-convex, bottoms F, G and H, is placed a false concavo-convex bottom of sheet-asbestos, or other suitable bibulous or spongy material, shown respectively at M, N and O, and cut to such size and shape that it will rest loosely on top of its appropriate foraminated concavo-convex sheet-metal bottom, upon which it is clamped down by the turn-buttons $a$, $e$ and $h$.

The top section or compartment A is filled partially with finely-broken stone, or washed and sifted gravel, preferably arranged in layers or strata, with the coarsest fragments on top and the finer particles nearer the bottom; but if desired, this filling or packing may be homogeneous throughout and consist of broken stone, gravel, or pebbles of approximately even grade or size. The middle compartment B is similarly packed with a mixture of charcoal and asbestos (or so-called "mineral wool"); and the bottom compartment contains a packing of purified and powdered well-burned willow charcoal. These filter-fillings or porous packings are separated from one another by the foraminated metal bottoms F, G and H, and the porous asbestos false bottoms M, N and O, so that they cannot by any possibility become mixed together.

From the foregoing description, taken in connection with the drawings, the manner of using this filter will readily be understood. The water (or other liquid) to be filtered is poured into the top compartment A, and, percolating through its coarse packing, will therein deposit the coarser impurities. It then filters slowly through the porous asbestos false bottom M and the foraminated bottom F down into the second or intermediate compartment B, where it is further purified by depositing such of its impurities, as it may still contain, in the packing of charcoal and asbestos with which this part or section of the filter is packed. Any trace of impurities (chiefly of organic nature) which it may still contain will be absorbed and neutralized by the combined mechanical and chemical action of the finely-powdered charcoal packing in the bottom compartment C, after which the now thoroughly purified water will filter through the bottom asbestos sheet O and foraminated sheet-metal bottom H appertaining to the same, down into the receiving or collecting reservoir I in the bottom of the filter from which it may be drawn, as needed for use, through the faucet or spigot K L.

In practice, to use my improved filter, the several sections of which it is made up are superimposed upon one another, as illustrated on the drawings, so that access may readily be had to any one of them simply by lifting up and removing the parts or sections superimposed upon the particular section to which it is desired to gain access. This dispenses with the use of hinges and simplifies the construction of the apparatus as a whole.

Having thus described my improvement, I claim and desire to secure by Letters Patent of the United States—

The improved water-filter herein shown and described, comprising the three filter-sections or compartments A, B and C, of gradually reduced bottom-area and superimposed one upon the other; each section or compartment being provided with an inwardly-projecting annular bottom-flange A', B' and C'; with a removable foraminated concavo-convex bottom F, G, and H; and with a removable false bottom M, N, and O, of porous sheet-asbestos; the lowermost compartment C having its sides extended downwardly and inwardly, forming a collecting-reservoir, I, provided with a central outlet J and spigot K L; substantially as and for the purpose shown and set forth.

In testimony that I claim the foregoing as my own I have hereunto affixed my signature in presence of two witnesses.

WILLIAM T. MILLER.

Witnesses:
LOUIS BAGGER,
STEWART SHEA.